(12) United States Patent
Kim et al.

(10) Patent No.: US 12,442,764 B2
(45) Date of Patent: Oct. 14, 2025

(54) TURBIDIMETER

(71) Applicant: THE WAVE TALK, INC., Daejeon (KR)

(72) Inventors: Young Dug Kim, Seongnam-si (KR); Kyoung Man Cho, Seoul (KR)

(73) Assignee: THE WAVE TALK, INC., Daejeon (KR)

( * ) Notice: Subject to any disclaimer, the term of this patent is extended or adjusted under 35 U.S.C. 154(b) by 195 days.

(21) Appl. No.: 18/203,352

(22) Filed: May 30, 2023

(65) Prior Publication Data

US 2023/0366816 A1 Nov. 16, 2023

Related U.S. Application Data

(63) Continuation of application No. PCT/KR2021/017779, filed on Nov. 29, 2021.

(30) Foreign Application Priority Data

Nov. 30, 2020 (KR) .................. 10-2020-0165150

(51) Int. Cl.
*G01N 21/47* (2006.01)
*G01N 21/51* (2006.01)

(52) U.S. Cl.
CPC ......... *G01N 21/4788* (2013.01); *G01N 21/51* (2013.01); *G01N 2021/479* (2013.01); *G01N 2021/513* (2013.01)

(58) Field of Classification Search
CPC ............... G01N 21/4788; G01N 21/51; G01N 2021/479; G01N 2021/513;

(Continued)

(56) References Cited

U.S. PATENT DOCUMENTS 5,259,509 A * 11/1993 Boal, Jr. ............ B65D 21/0223
                                                             206/508
7,652,773 B2    1/2010 DiMarzio et al.
(Continued)

FOREIGN PATENT DOCUMENTS

EP    3379234 A1    9/2018
EP    2238233 B1    5/2020
(Continued)

OTHER PUBLICATIONS

International Search Report of PCT/KR2021/017779 dated Mar. 14, 2022.

(Continued)

*Primary Examiner* — Isiaka O Akanbi
(74) *Attorney, Agent, or Firm* — Dinsmore & Shohl LLP; Yongsok Choi, Esq.

(57) ABSTRACT

Provided is a turbidity meter including a main body, a fluid container which is formed inside the main body and in which a fluid is accommodatable, a fluid inlet pipe which is connected to the fluid container and via which the fluid is supplied to the fluid container, a fluid outlet pipe which is connected to the fluid container and via which the fluid is discharged from the fluid container to the outside, a wave source configured to irradiate waves toward the fluid container, a detector configured to detect a laser speckle at every time point set in advance, the laser speckle being generated due to multiple scattering of the irradiated waves in the fluid, and a controller configured to estimate the presence or absence of impurities in the fluid in real-time by using the detected laser speckle.

14 Claims, 10 Drawing Sheets

(58) Field of Classification Search
CPC .......... G01N 2015/019; G01N 15/075; G01N 2021/0382; G01N 21/45; G01N 21/94; G01N 2021/516; G01N 21/53; G01N 15/0205; G01N 1/14; G01N 33/18
USPC .................................................. 356/436, 337
See application file for complete search history.

(56) References Cited

U.S. PATENT DOCUMENTS

| | | | |
|---|---|---|---|
| 2012/0225474 A1* | 9/2012 | Wagner | G01N 15/1434 |
| | | | 435/288.7 |
| 2017/0209047 A1* | 7/2017 | Zalevsky | A61B 5/1455 |
| 2018/0202967 A1* | 7/2018 | Hsieh | G01N 27/44721 |
| 2018/0284009 A1* | 10/2018 | Kaduchak | G01N 21/532 |
| 2021/0025803 A1* | 1/2021 | Kim | G06V 10/82 |
| 2021/0080369 A1* | 3/2021 | Kim | G01N 33/487 |
| 2021/0164899 A1* | 6/2021 | Kim | G01N 21/4788 |

FOREIGN PATENT DOCUMENTS

| | | | | |
|---|---|---|---|---|
| JP | 2005106687 A | 4/2005 | | |
| KR | 1020130136451 A | 12/2013 | | |
| KR | 1020160114711 A | 10/2016 | | |
| KR | 101686766 B1 | 12/2016 | | |
| KR | 1020180053984 A | 5/2018 | | |
| KR | 1020190029539 A | 3/2019 | | |
| KR | 1020200132356 A | 11/2020 | | |
| WO | WO-2019221557 A1 * | 11/2019 | ............... | A61L 2/28 |

OTHER PUBLICATIONS

Extended European Search Report of European Patent Application No. EP21898722.0, dated Apr. 2, 2024, 12 pages, European Patent Office.

* cited by examiner

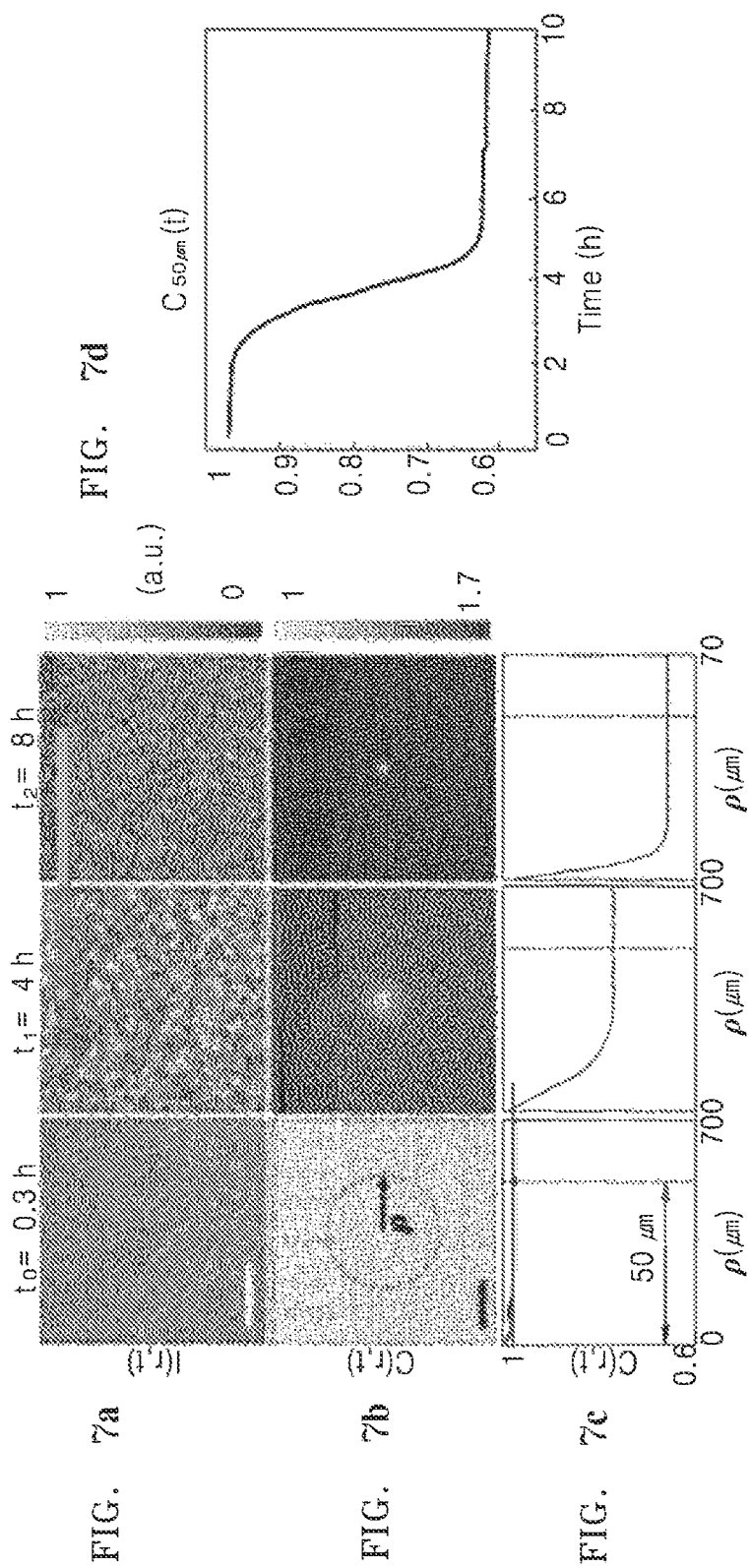

FIG. 8a
(a) Camera image
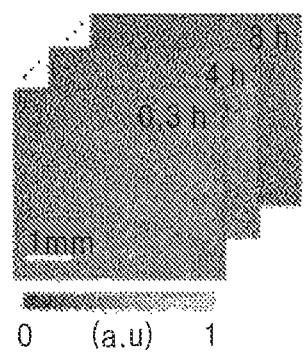
FIG. 8b
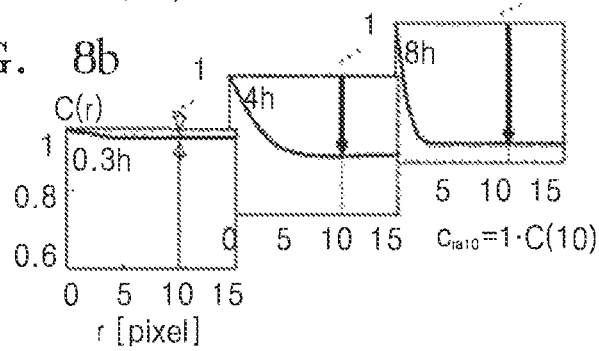
FIG. 8c
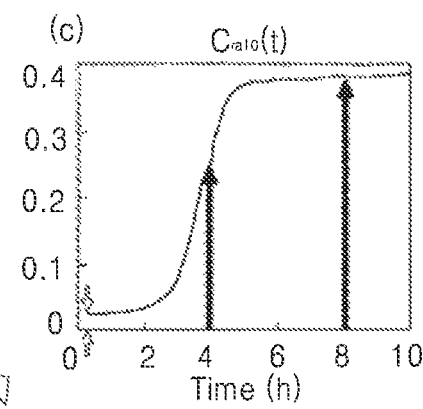
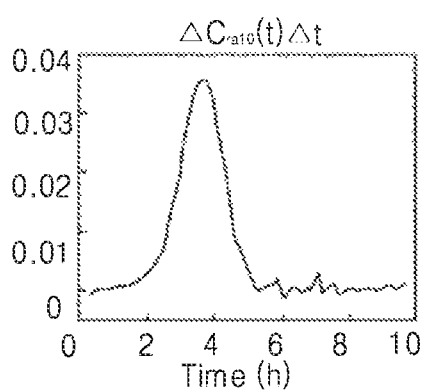

TURBIDIMETER

CROSS-REFERENCE TO RELATED APPLICATION

The present application is a continuation of International Application No. PCT/KR2021/017779, filed on Nov. 29, 2021, which claims the benefit of Korean Patent Application No. 10-2020-0165150 filed on Nov. 30, 2020 in the Korean Intellectual Property Office, the entire disclosure of each of which is incorporated herein by reference.

TECHNICAL FIELD

Embodiments of the present disclosure relate to a turbidity meter.

BACKGROUND ART

In general, fluids such as water or beverages are supplied to users through various treatments such as filtration. In the case of a fluid intended for drinking, substances other than additives that are added in the fluid as necessary, for example, microorganisms and the like should be removed and then the fluid is supplied to the user. However, in the process of processing the fluid, microorganisms in the fluid may unintentionally proliferate due to circumstances such as contact with external air.

Various methods have been proposed in the related art to detect microorganisms in a fluid and examine water quality, but it is very difficult to detect extremely small amounts of microorganisms in the fluid.

Meanwhile, turbidity is an indicator for quantitatively expressing a degree of turbidity of water, and represents resistance against transmission of light. The turbidity is used as one of important indicators representing the quality of drinking water. Conventional turbidity meters for measuring such turbidity include probe-type turbidity meters, which are typically portable, and all-in-one turbidity meters, which are installed in the field such as at water treatment plants. In order for these turbidity meters to more accurately measure the turbidity, the amount of microbubbles in a sample must be minimized and the sample must not be affected by the external environment such as temperature, pressure, and the like.

SUMMARY

Technical Problem

In order to address the above-described issues and/or limitations, the present disclosure provides a turbidity meter capable of examining the turbidity of a fluid by detecting microorganisms in the fluid in real-time using a chaotic wave sensor.

Technical Solution to Problem

An embodiment of the present disclosure provides a turbidity meter including a main body, a fluid container which is formed inside the main body and in which a fluid is accommodatable, a fluid inlet pipe which is connected to the fluid container and via which the fluid is supplied to the fluid container, a fluid outlet pipe which is connected to the fluid container and via which the fluid is discharged from the fluid container to the outside, a wave source configured to irradiate waves toward the fluid container, a detector configured to detect a laser speckle at every time point set in advance, the laser speckle being generated due to multiple scattering of the irradiated waves in the fluid, and a controller configured to estimate the presence or absence of impurities in the fluid in real-time by using the detected laser speckle.

Advantageous Effects of Disclosure

A turbidity meter according to embodiments of the present disclosure is capable of examining turbidity in a fluid by estimating the presence or absence and/or a concentration of microorganisms in the fluid rapidly at low costs by using a change in a temporal or spatial correlation of a laser speckle.

BRIEF DESCRIPTION OF DRAWINGS

FIGS. 7A to 7D and 8A to 8C are diagrams for describing principles of determining concentration information of a high concentration sample in a turbidity meter according to another embodiment of the present disclosure.

DETAILED DESCRIPTION

Figure 1:
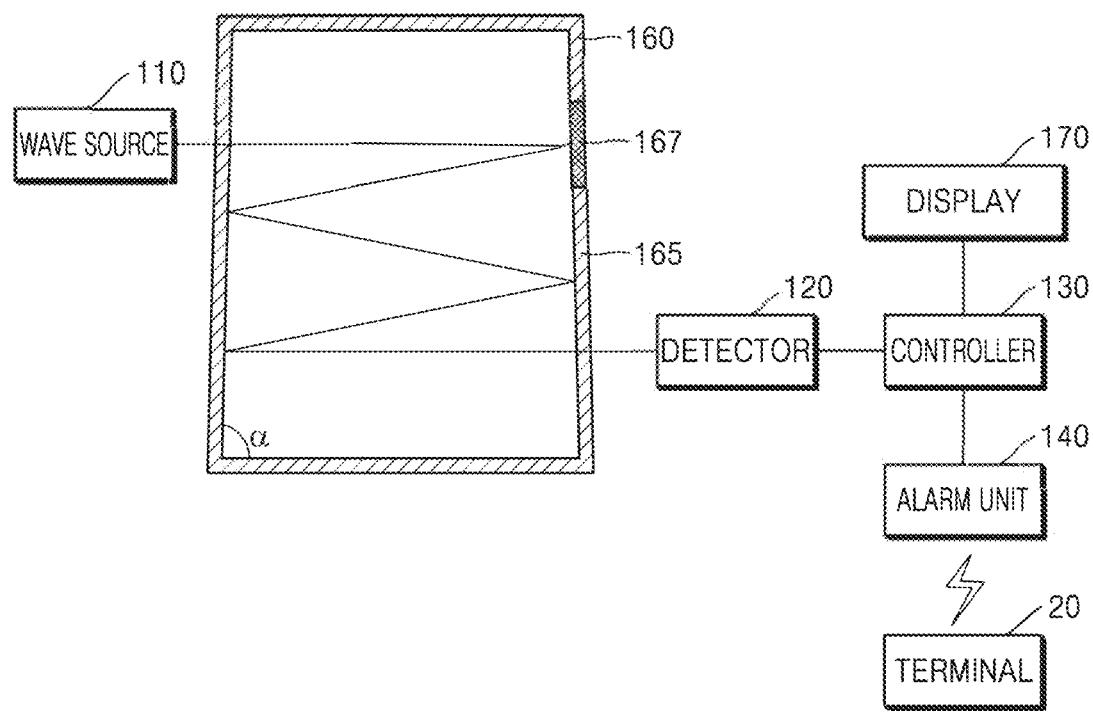
FIG. 1 is a conceptual diagram schematically illustrating a turbidity meter according to an embodiment of the present disclosure.

An embodiment of the present disclosure provides a turbidity meter including a main body, a fluid container which is formed inside the main body and in which a fluid is accommodatable, a fluid inlet pipe which is connected to the fluid container and via which the fluid is supplied to the fluid container, a fluid outlet pipe which is connected to the fluid container and via which the fluid is discharged from the fluid container to the outside, a wave source configured to irradiate waves toward the fluid container, a detector configured to detect a laser speckle at every time point set in advance, the laser speckle being generated due to multiple scattering of the irradiated waves in the fluid, and a controller configured to estimate the presence or absence of impurities in the fluid in real-time by using the detected laser speckle.

In an embodiment of the present disclosure, the fluid container may include a bottom portion formed inside the main body, and a wall portion formed to have a predetermined angle with respect to the bottom portion.

In an embodiment of the present disclosure, the angle formed by the bottom portion and the wall portion may not be a right angle.

In an embodiment of the present disclosure, the angle may be 85° or more and 88° or less.

In an embodiment of the present disclosure, the wall portion may taper toward an upper surface of the main body.

In an embodiment of the present disclosure, dissolved oxygen present in the fluid may be removed by periodically supplying the fluid into the fluid container via the fluid inlet pipe and discharging the fluid from the fluid container via the fluid outlet pipe.

In an embodiment of the present disclosure, a height of the fluid outlet pipe may be formed to be less than or equal to a height of the fluid inlet pipe.

In an embodiment of the present disclosure, a second fluid outlet pipe may be further disposed at a higher position than the fluid inlet pipe and the fluid outlet pipe.

In an embodiment of the present disclosure, the bottom portion or the wall portion may include a multiple scattering amplification region for amplifying the number of times the wave irradiated from the wave source is multiple-scattered in the fluid.

In an embodiment of the present disclosure, the multiple scattering amplification region may amplify the number of multiple scattering in the fluid by reflecting at least some of the waves emitted from the fluid onto the fluid.

In an embodiment of the present disclosure, the controller may obtain a temporal correlation of the detected laser speckle by using the detected laser speckle, and estimate the presence or absence of microorganisms in the fluid in real-time on the basis of the obtained temporal correlation.

In an embodiment of the present disclosure, the temporal correlation may include a difference between first image information of the laser speckle detected at a first time point and second image information of the laser speckle detected at a second time point that is different from the first time point.

In an embodiment of the present disclosure, the first image information and the second image information may include at least one of pattern information of the laser speckle and intensity information of the wave.

In an embodiment of the present disclosure, the controller may obtain a spatial correlation of an interference pattern of an optical image detected by the detector, and determine the presence or absence of microorganisms in the fluid on the basis of a change in the spatial correlation of the interference pattern according to time.

Another embodiment of the present disclosure provides a method of examining turbidity, the method including filling a fluid container with a fluid by introducing the fluid into the fluid container via a fluid inlet pipe, irradiating, by a wave source, a wave having coherence to the fluid container, in which the fluid is accommodated, detecting, by a detector, a laser speckle generated by multiple scattering of the irradiated wave from the wave source in the fluid, at every time point set in advance, estimating, by a controller, the presence or absence of microorganisms in the fluid in real-time by using the detected laser speckle, and discharging the fluid in the fluid container to the outside via a fluid outlet pipe.

In an embodiment of the present disclosure, the method may further include removing dissolved oxygen in the fluid by introducing the fluid into the fluid container via the fluid inlet pipe and discharging the fluid in the fluid container to the outside via the fluid outlet pipe.

Other aspects, features, and advantages other than those described above will become apparent from the following drawings, claims, and detailed description of the disclosure.

Mode of Disclosure

Hereinafter, embodiments will be described below in detail with reference to the accompanying drawings, and when the embodiments of the present disclosure are described with reference to the drawings, the same or corresponding components are given the same reference numerals, and repetitive descriptions thereof will be omitted.

As the present embodiments allow for various modifications, particular embodiments will be illustrated in the drawings and further described in the detailed description. The effects and features of the present embodiments and the accompanying methods thereof will become apparent from the following description of the contents taken in conjunction with the accompanying drawings. However, the present embodiments are not limited to the embodiments described below, and may be implemented in various forms.

It will be understood that although the terms "first," "second," and the like may be used herein to describe various components, these components should not be limited by these terms. These components are only used to distinguish one component from another.

As used herein, an expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

In the following embodiment, when a part, such as a unit, a region, or a component, is present on or above another part, it includes not only a case in which the part is directly on another part, but also a case in which another unit, region, or component is interposed therebetween.

In the following embodiments, terms such as "connecting" or "coupling" two members do not necessarily mean a direct and/or fixed connection or coupling of the two members, unless the context clearly indicates otherwise, and do not preclude other members from being interposed between the two members.

The presence of a feature or component described in the specification does not preclude the possibility of the addition of one or more other features or components.

For convenience of description, sizes of components shown in the drawings may be exaggerated or reduced. For example, since the size and thickness of each component shown in the drawings are arbitrarily illustrated for convenience of description, the following embodiments are not necessarily limited thereto.

Figure 2:
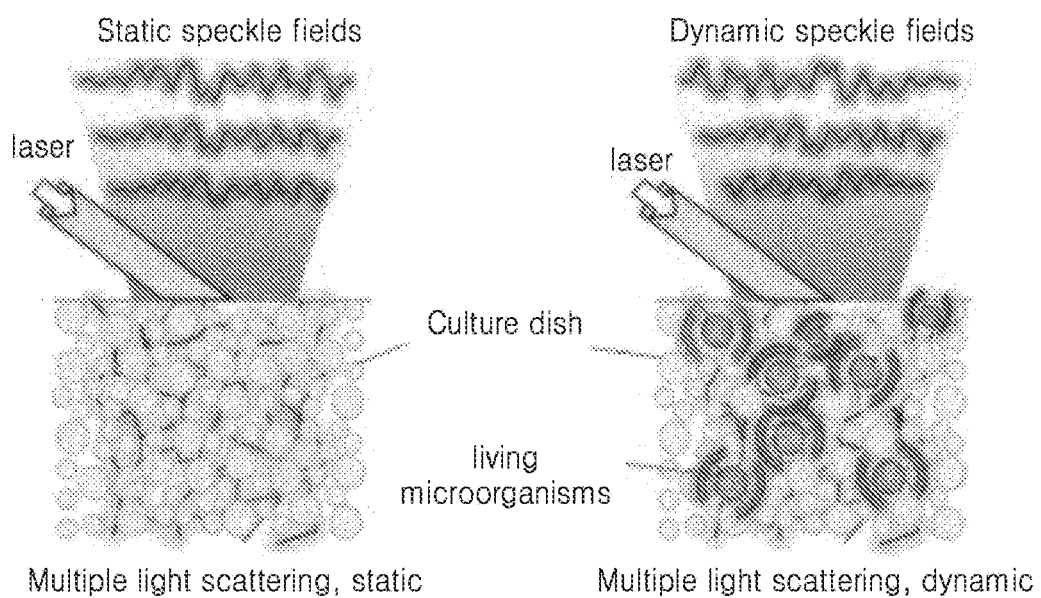
FIG. 2 is a diagram for describing principles of a chaotic wave sensor according to an embodiment of the present disclosure.
Figure 3:
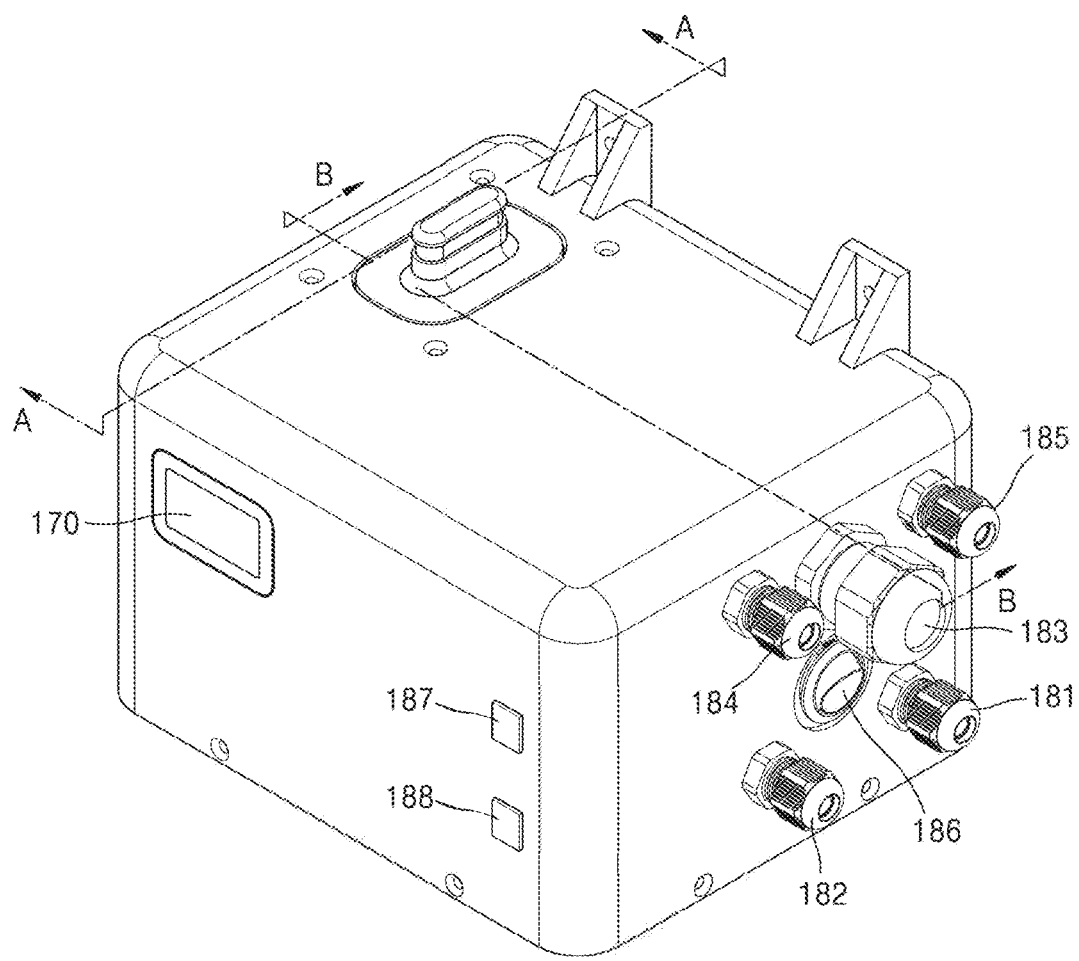
FIG. 3 is a perspective view of a turbidity meter that is actually implemented from the conceptual diagram of FIG. 1.
Figure 4:
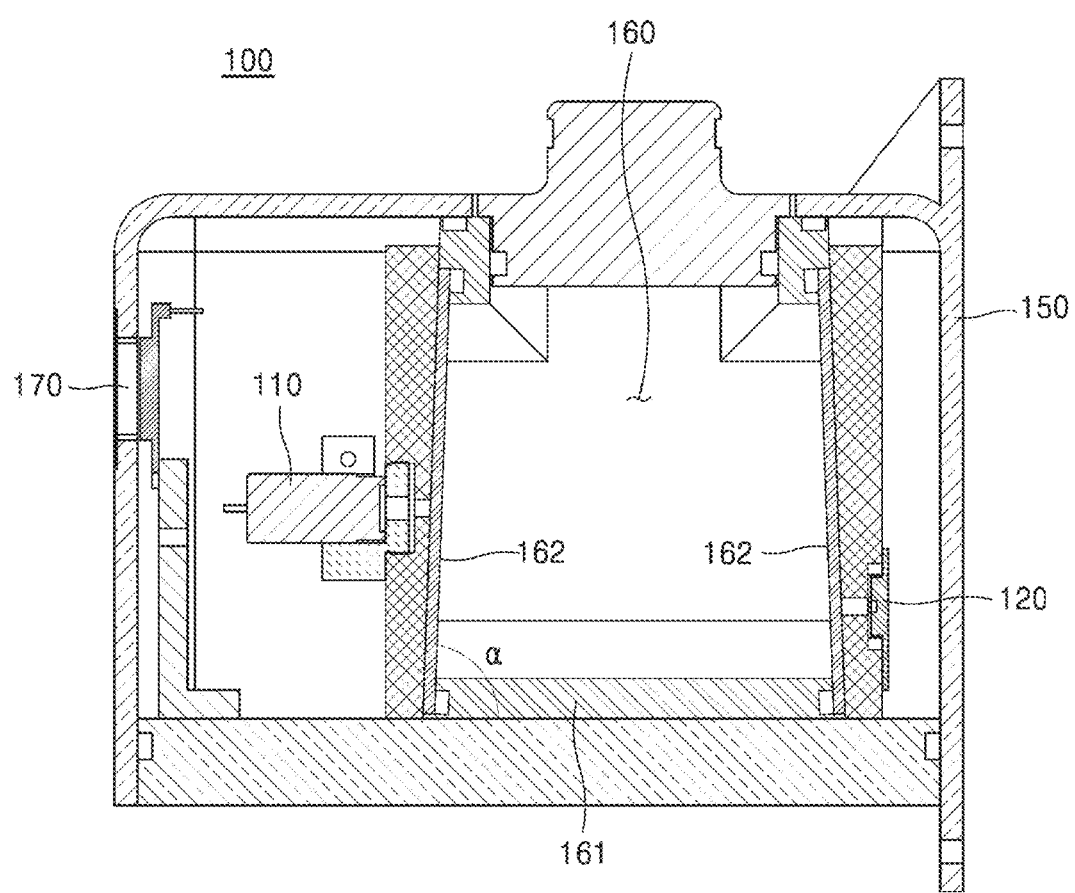
FIG. 4 is a cross-sectional view taken along line A-A of FIG. 3.
Figure 5:
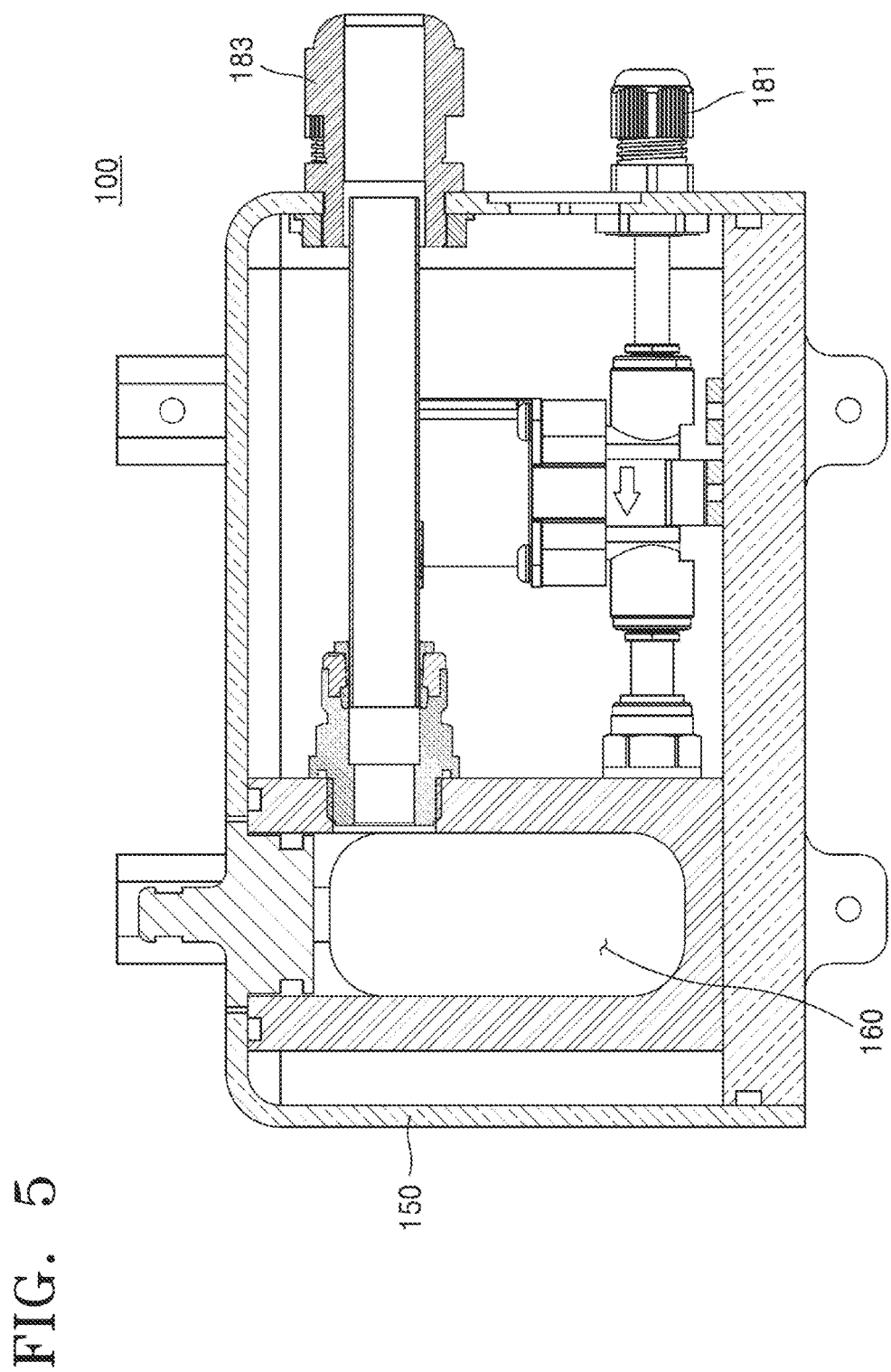
FIG. 5 is a cross-sectional view taken along line B-B of FIG. 3.

FIG. 1 is a conceptual diagram schematically illustrating a turbidity meter 100 according to an embodiment of the present disclosure, and FIG. 2 is a diagram for describing principles of a chaotic wave sensor according to an embodiment of the present disclosure. In addition, FIG. 3 is a perspective view of a turbidity meter that is actually implemented from the conceptual diagram of FIG. 1, FIG. 4 is a cross-sectional view taken along line A-A of FIG. 3, and FIG. 5 is a cross-sectional view taken along line B-B of FIG. 3.

First, referring first to FIG. 1, the turbidity meter 100 according to an embodiment of the present disclosure may include a wave source 110, a detector 120, and a controller 130. In addition, the turbidity meter 100 of FIG. 1 may further include an alarm unit 140, a fluid container 160, and a display 170. In addition, a fluid L that is an object to be examined may be contained in the fluid container 160. Further, the fluid container 160 may include a multiple scattering amplification region 165 for amplifying the number of times a wave irradiated from the wave source 110 is multiple-scattered in the fluid L.

Here, the fluid L may be a liquid or a gas. In addition, the fluid L may be a material in which microorganisms may proliferate, for example, water that does not contain a scattering material therein. However, the present disclosure is not limited thereto, and in another embodiment, the fluid L may be a material such as milk including a scattering material therein. Hereinafter, for convenience of description, a case in which the fluid L does not include the scattering material therein will be described first, and the fluid L including the scattering material will be described later.

The wave source 110 may irradiate a wave toward the fluid L inside the fluid container 160. The wave source 110 may include all kinds of source devices capable of generating a wave, for example, may be a laser capable of irradiating light of a specific wavelength band.

The detector 120 may detect the presence or absence of microorganisms M, which are impurities in the fluid L, by using the wave. In the present specification, the detector 120 may include a chaotic wave sensor. Here, the impurities may include insoluble suspended materials. The detector 120 may also perform a function of detecting impurities included in the fluid L, as well as the microorganisms M. However, for convenience of description, the case of detecting the microorganisms M in the fluid L will be mainly described below.

Hereinafter, the principle of the chaotic wave sensor of the present disclosure will be described with reference to FIG. 2.

In the case of a material having a uniform internal refractive index, such as glass, when light is irradiated to the material, the light is refracted in a constant direction. However, when coherent light such as a laser is irradiated to a material having a non-uniform internal refractive index, multiple scattering that is very complicated occurs in the material.

Referring to FIG. 2, some of light or waves (hereinafter, referred to as waves for simplicity) irradiated from the wave source, which are scattered through complicated paths due to the multiple scattering, pass through a surface of an object to be examined. The waves passing through multiple points in the surface of the object to be examined generate constructive interference or destructive interference, and the constructive/destructive interference of the waves generates grain patterns (speckles).

In the present specification, the waves scattered in the complicated paths are referred to as "chaotic waves", and the chaotic waves may be detected through laser speckles.

Referring to a left side of FIG. 2 again, it shows a state in which a laser is irradiated to a stabilized medium. When coherent light (e.g., a laser) is irradiated to the stabilized medium, in which an internal constituent material does not move, a stabilized speckle pattern without a variation may be observed.

However, as shown at a right side of FIG. 2, in the case of the non-stabilized medium in which the internal constituent material is moving, such as bacteria, the speckle pattern varies That is, a light path may be minutely changed according to time due to minute biological activities of living things (e.g., intracellular movement, movement of microorganisms, movement of mites, or the like). Since the speckle pattern is a phenomenon caused by the interference of waves, a minute change in the light path can cause a variation in the speckle pattern. Accordingly, by measuring a temporal variation in the speckle pattern, movements of living things may be rapidly measured. As described above, when the variation in the speckle pattern according to time is measured, the presence or absence and concentration of the living things may be identified, and further, kinds of the living things may also be identified.

In the present specification, a configuration for measuring the variation in the speckle pattern is defined as a chaotic wave sensor.

Meanwhile, since the fluid L such as water does not contain a homogeneous material that generates scattering therein as described above, when the microorganisms M are not present, the laser speckle may not be generated. However, the turbidity meter 100 according to an embodiment of the present disclosure may generate a stabilized laser speckle pattern by multi-scattering waves through the multiple scattering amplification region 165, which will be described later. According to the turbidity meter 100, when the microorganisms M are present in the fluid L contained in the fluid container 160, the path of the wave may be minutely changed by the movement of the microorganisms. The minute change in the wave path may cause a variation in the speckle pattern, and accordingly, by measuring the temporal variation of the speckle pattern, the presence or absence of the microorganisms M in the fluid L may be rapidly detected.

Referring to FIGS. 1 and 2 again, the turbidity meter 100 according to an embodiment of the present disclosure may include the wave source 110, the detector 120, and the controller 130.

The wave source 110 may irradiate a wave toward the fluid L inside the fluid container 160. The wave source 110 may include all kinds of source devices capable of generating a wave, for example, may be a laser capable of irradiating light of a specific wavelength band. Although the present disclosure is not limited to the kind of wave source, for convenience of description, a case in which the wave source is a laser will be mainly described below.

For example, the laser having excellent coherence may be used as the wave source 110 in order to form speckles in the fluid L. In this case, measurement accuracy may increase as a spectral bandwidth of a wave source, which determines the coherence of the wave source, decreases. That is, when a coherence length increases, the measurement accuracy also increases. Accordingly, a wave source irradiating laser light having a spectral bandwidth that is less than a reference bandwidth set in advance may be used as the wave source 110, and the measurement accuracy may increase as the spectral bandwidth is shorter than the reference bandwidth. For example, the spectral bandwidth of the wave source may be set such that the conditions of Equation 1 below are maintained.

$$\text{Spectral bandwidth} < 1 \text{ nM} \qquad [\text{Equation 1}]$$

According to Equation 1, when light is irradiated into the fluid at every reference time in order to measure a variation in the laser speckle pattern, the spectral bandwidth of the wave source 110 may be maintained to be less than 1 nm.

The detector 120 may detect the laser speckle, which is generated by the irradiated wave multi-scattered in the fluid L, at every time point set in advance. Here, the time point may denote one instant during continuous flow of time, and time points may be set in advance with an equal time interval therebetween, but are not necessarily limited thereto, and may be set in advance with an arbitrary time interval. The detector 120 may include a detection means corresponding to the kind of the wave source 110, for example, a charge-coupled device (CCD), which is an imaging device that captures images, may be used when using a light source in the visible light wavelength band. The detector 120 may detect the laser speckle at least at a first time point, and may detect the laser speckle at a second time point, and may provide the detected laser speckles to the controller 130. It should be noted that the first time point and the second time point are merely examples selected for convenience of description, and the detector 120 may detect laser speckles at a plurality of time points more than the first and second time points.

Specifically, when the wave is irradiated to the fluid L, the incident wave may form laser speckle due to the multiple scattering. The laser speckle is generated by a light interference phenomenon, and thus, when there is no microorganism in the fluid, a constant interference pattern may always be shown according to time due to the multiple scattering amplification region. In comparison with this, when microorganisms are present in the fluid L, the laser speckle may vary according to time due to the movement of the microorganisms M. The detector 120 detects the laser speckle varying according to time at every time point set in advance, to provide the laser speckles to the controller 130. The detector 120 may detect the laser speckle at a speed sufficient to detect the movement of the microorganisms M, for example, at a speed of 25 frames to 30 frames per second.

Meanwhile, in a case in which an image sensor is used as the detector 120, the image sensor may be disposed such that a size d of one pixel in the image sensor is less than or equal to a grain size of the speckle pattern. For example, the image sensor may be disposed in an optical system included in the detector 120 to satisfy the condition of Equation 2 below.

$$d \leq \text{speckle grain size} \quad \text{[Equation 2]}$$

As shown in Equation 2, the size d of one pixel of the image sensor should be less than or equal to the grain size of the speckle pattern, but when the size of the pixel is too small, undersampling may occur and it may be difficult to utilize a pixel resolution. Accordingly, in order to achieve an effective signal to noise ratio (SNR), the image sensor may be disposed such that five or less pixels are located to correspond to the speckle grain size.

The controller 130 may obtain a temporal correlation of the detected laser speckle, by using the detected laser speckle. The controller 130 may estimate, in real-time, the presence or absence of the microorganisms in the fluid L on the basis of the obtained temporal correlation. In the present specification, the term "real-time" denotes estimating the presence of the microorganisms M within three seconds, and preferably, the presence of the microorganisms M may be estimated within one second.

In an embodiment, the controller 130 may estimate the presence or absence of the microorganisms M using a difference between first image information of the laser speckle detected at the first time point and second image information of the laser speckle detected at the second time point that is different from the first time point. Here, the first image information and the second image information may be at least one of laser speckle pattern information and wave intensity information.

Meanwhile, in the embodiment of the present disclosure, the difference between the first image information at the first time point and the second image information at the second time point is not only used, but pieces of image information of a plurality of laser speckles at a plurality of time points may be also used. The controller 130 may calculate a temporal correlation coefficient between images by using the image information of the laser speckle generated at each of the plurality of time points set in advance, and may estimate the presence or absence of the microorganisms M in the fluid L on the basis of the temporal correlation coefficient. The temporal correlation between the detected laser speckle images may be calculated using Equation 3 below.

$$\overline{C}(x, y; \tau) = \frac{1}{T-\tau} \sum_{t=1}^{T-\tau} \overline{I}(x, y; t)\overline{I}(x, y; t+\tau)\delta t \quad \text{[Equation 3]}$$

In Equation 3, $\overline{c}$ denotes the temporal correlation coefficient, $\overline{I}$ denotes a normalized light intensity, (x,y) denotes a pixel coordinate of the camera, t denotes a measured time, T denotes a total measurement time, and τ denotes a time lag.

The temporal correlation coefficient may be calculated according to Equation 3, and in an embodiment, the presence or absence of the microorganisms may be estimated by analyzing whether the temporal correlation coefficient falls below a reference value set in advance. Specifically, when the temporal correlation coefficient falls below the reference value beyond an error range set in advance, it may be estimated that the microorganisms are present.

In addition, the detector 120 may estimate a concentration of impurities in the fluid L accommodated in the fluid container 160. Here, the detector 120 may perform a function of measuring the turbidity of the fluid L by estimating the concentration of the impurities in the fluid L. It is difficult for a general turbidity measurement device to measure an impurity concentration of 105 colony-forming units per milliliter (cfu/ml) or less. However, the detector 120 according to an embodiment of the present disclosure is capable of measuring the impurity concentration of 106 cfu/ml or less by using a method of determining a concentration of impurities as described below. Here, the impurities are not limited to microorganisms. Hereinafter, for convenience of description, a method of determining a concentration of microorganisms by using the laser speckle by the controller 130 will be described in detail below based on the case in which the impurities are the microorganisms.

The controller 130 may calculate a standard deviation of light intensity of the laser speckle based on a laser speckle image measured at every reference time. As the microorganisms included in the fluid L continuously move, constructive interference and destructive interference may vary in response to the movements. Here, the degree of light intensity may be largely changed as the constructive interference and the destructive interference change. Then, the controller 130 may detect the microorganisms in the fluid container 160 by obtaining a standard deviation representing the variation degree of the light intensity, and may measure the distribution of the microorganisms.

For example, the controller 130 may combine the laser speckle image measured at every time determined in advance, and may calculate the standard deviation of the light intensity of the laser speckle according to time from the combined images. The standard deviation of the light intensity of the laser speckle according to time may be calculated on the basis of Equation 4 below.

$$S(x, y) = \sqrt{\frac{1}{T} \sum_{t=1}^{T}(I_t(x, y) - \overline{I})^2} \quad \text{[Equation 4]}$$

In Equation 4 above, S denotes the standard deviation, (x,y) denotes a pixel coordinate of the camera, T denotes a total measurement time, t denotes a measurement time, $I_t$ denotes a light intensity measured at the time t, and $\overline{I}$ denotes an average light intensity according to time.

Depending on the movements of the microorganisms, the constructive and destructive interference patterns may vary, and the standard deviation value calculated based on Equation 4 increases, and thus, the concentration of the microorganisms may be measured based on the standard deviation value. However, the present disclosure is not limited to the method of measuring the concentration of microorganisms by using Equation 4 above, and the concentration of microorganisms may be measured by any method using a difference in the detected laser speckles.

In addition, the controller 130 may estimate the distribution, that is, the concentration of the microorganisms included in the fluid, based on a linear relationship between a magnitude of the standard deviation value of the laser speckle light intensity and the concentration of the microorganisms.

Meanwhile, the multiple scattering amplification region 165 may amplify the number of multiple scattering in the fluid L by reflecting at least some of the waves emitted from the fluid L toward the fluid L again. The multiple scattering amplification region 165 may include a multiple scattering material. For example, the multiple scattering material may include a particle having a large refractive index and having a diameter less than or equal to a micrometer, for example, titanium oxide ($TiO_2$) nanoparticles. Here, the multiple scattering amplification region 165 may be formed by coating the multiple scattering material on surfaces of a bottom portion 161 (see FIG. 4) and a wall portion 162 (see FIG. 4) of the fluid container 160. However, the present disclosure is not limited thereto, and in another embodiment, the multiple scattering amplification region 165 may also be formed by including the multiple scattering material in the bottom portion 161 (see FIG. 4) and the wall portion 162 (see FIG. 4) themselves.

Meanwhile, at least a portion of the multiple scattering amplification region 165 may include a reflection region 167 that reflects all of the waves emitted from the fluid L to the fluid L. The reflection region 167 may minimize the wave emission from the fluid L to the outside of the turbidity meter 100, thereby amplifying a microorganism detection rate of the detector 120. The reflection region 167 may be disposed to face an incident region on which the wave is incident from the wave source 110. By reflecting all of the waves irradiated from the wave source 110 into the fluid L by the reflection region 167, an amount of waves that may be multiple-scattered in the fluid L may be increased, which allows the microorganism detection rate of the detector 120 to be amplified. In another embodiment, an entire region of the multiple scattering amplification region 165 except for a moving path of the waves emitted toward the detector 120 may include the reflection region.

Referring to FIG. 1 again, the turbidity meter 100 according to an embodiment of the present disclosure may further include the alarm unit 140 and the display 170. In addition, the turbidity meter 100 may be connected to an external terminal 20 or server (not shown) via a network.

When a signal t1 indicating the presence of microorganisms is input from the controller 130, the alarm unit 140 may notify a user of the signal. The alarm unit 140 may notify the presence of microorganisms in the fluid by using at least one of sound and light. The alarm unit 140 may include a lighting means such as a light-emitting diode (LED) for generating an alert signal via light and a speaker (not shown) for generating an alert signal via sound, and the light and the sound may be simultaneously generated.

In addition, the turbidity meter 100 may further include a communication means (not shown) that may communicate with the terminal 20 of a user. When the signal t1 indicating the presence of microorganisms is input from the controller 130, the alarm unit 140 may provide information including a microorganism detection signal to the terminal 20 via a wireless or wired communication means (not shown). In addition, although not shown in the drawing, the alarm unit 140 may also provide the above information to the server (not shown). When the information about whether microorganisms are detected, the time at which microorganisms are detected, and the concentration of the microorganisms are uploaded through the alarm unit 140, the turbidity meter 100 registers the information on the server (not shown) and provides an interface through which other users may search for the data registered on the server (not shown). The turbidity meter 100 according to an embodiment may establish a situation in which microorganisms are generated, or the like as a database through the above-described processes. The terminal 20 may include a personal computer or a portable terminal on which a Web service may be used in a wired/wireless communication environment.

The display 170 outputs the detection results detected by the detector 120 as visual information. That is, it is possible to output various pieces of data by processing information about the turbidity in the fluid estimated from the information about the presence or absence and/or concentration of the microorganisms in the fluid L. Here, image processing processes for allowing the received image to be output as an image through the display 170 may be performed by the controller 130.

Continuing to refer to FIGS. 3 to 5, the turbidity meter 100 according to an embodiment of the present disclosure may include the wave source 110, the detector 120, a main body 150, the fluid container 160, and the display 170. In addition, although not shown in FIGS. 3 to 5, the turbidity meter 100 may further include the controller 130 (see FIG. 1) and the alarm unit 140 (see FIG. 1) described with reference to FIG. 1. Since the wave source 110 and the detector 120 are described in FIG. 1 or the like, detailed descriptions thereof will be omitted here.

The main body 150 forms an outer shape of the turbidity meter 100, and the wave source 110, the detector 120, the fluid container 160, and the like may be formed in the main body 150. In the drawings, the main body 150 are illustrated as being formed in an overall hexahedral shape, but the spirit of the present disclosure is not limited thereto, and it will be appreciated that the size, shape, and material of the main body 150, as well as, the position at which the fluid container 160 is formed in the main body 150, may be variously changed.

The fluid container 160 may be formed in the form of a hollow box so that a fluid is accommodated therein. The fluid container 160 may include the bottom portion 161 and the wall portion 162. In other words, it may be expressed that the fluid container 160 is formed by the bottom portion 161 and the wall portion 162.

The bottom portion 161 forms a bottom surface of the fluid container 160 and is formed in a substantially flat shape. The multiple scattering amplification region 165 described above may be formed in at least a portion of the bottom portion 161.

Meanwhile, the wall portion 162 is formed in a direction approximately perpendicular to the bottom portion 161. The multiple scattering amplification region 165 and/or the reflection region 167 described above may be formed in at least a portion of the wall portion 162.

Here, in the turbidity meter 100 according to an embodiment of the present disclosure, an angle α formed by the wall portion 162 and the bottom portion 161 is not exactly a right angle, but is formed to be slightly inclined (i.e., obliquely).

In detail, in the turbidity meter 100 according to an embodiment of the present disclosure, when light is scattered due to a laser reflection, some of the scattered light is emitted to the outside, and thus there is a loss in a light amount received by the detector 120 (see FIG. 1), which affects a result obtained through the light scattering analysis.

In order to address the above issue, according to an embodiment of the present disclosure, the angle α formed by the wall portion 162 and the bottom portion 161 is not exactly a right angle, but is formed to be slightly inclined. That is, the wall portion 162 is formed such that the angle α formed by the wall portion 162 and the bottom portion 161 is about 85° to 88°, so that the laser reflected by the wall portion 162 is directed opposite to an open surface to reduce the loss of the light amount, thereby increasing a light scattering effect.

In other words, it may be expressed that the wall portion 162 is formed to have an inlet that gradually narrows as it moves upward (that is, in a +Z-axis direction), or it may also be expressed that a diameter thereof is gradually reduced as it moves upward. According to the present disclosure as described above, the light scattering effect may be improved by reducing the loss in the light emitted from the wave source 110 to the outside.

Meanwhile, the turbidity meter 100 according to an embodiment of the present disclosure may further include a fluid inlet pipe 181, a fluid outlet pipe 182, a second fluid outlet pipe 183, a power supply 184, a data output unit 185, a power switch 186, a measurement button 187, and a calibration button 188.

The fluid inlet pipe 181 serves to supply a fluid into the fluid container 160.

The fluid outlet pipe 182 serves to discharge the fluid in the fluid container 160 to the outside.

Here, the turbidity meter 100 according to an embodiment of the present disclosure does not have a separate fluid container for removing bubbles, but instead performs a function of removing dissolved oxygen present in a fluid by periodically (e.g., once per minute) injecting and discharging the fluid into and from the fluid container 160.

In addition, to this end, the fluid inlet pipe 181 and the fluid outlet pipe 182 are arranged at a lower end of the fluid container 160, but a discharge port may be disposed at a lower position than an inlet port. Here, the fluid inlet pipe 181 and the fluid outlet pipe 182 are illustrated in the drawings as having the same height, but the spirit of the present disclosure is not limited thereto, and the fluid outlet pipe 182 may be disposed at a position equal to or lower than a position of the fluid inlet pipe 181. By forming the height of the fluid outlet pipe 182 to be less than the height of the fluid inlet pipe 181 as described above, the fluid in the fluid container 160 may be smoothly discharged.

Furthermore, in order to prevent overflow from the fluid inlet pipe 181 and the fluid outlet pipe 182, the second fluid outlet pipe 183 may be additionally disposed at a position higher than those of the fluid inlet pipe 181 and the fluid outlet pipe 182. Here, a fluid discharge capacity per unit time of the second fluid outlet pipe 183 may be greater than that of the fluid outlet pipe 182.

The power supply 184 may be connected to an external power source and may serve to supply external power to the turbidity meter 100. In addition, the power switch 186 may serve to open and close the supply of power to the power supply 184.

The data output unit 185 may be connected to an external electronic device (the external terminal 20 or server (not shown)) and may serve to output data measured by the turbidity meter 100 to the outside.

The measurement button 187 may serve to turn on/off a turbidity measurement function of the turbidity meter 100.

The calibration button 188 may serve to turn on/off a calibration function. Here, the calibration function refers to a function of periodically (e.g., every two years) injecting a standard material whose measurement value is already known to the fluid container 160, and calibrating a data deviation of the standard material when the data deviation is generated.

As described above, the turbidity meter 100 of the present disclosure does not have a separate fluid container for removing bubbles, but instead performs the function of removing dissolved oxygen present in a fluid by periodically (e.g., once per minute) injecting and discharging the fluid into and from the measuring fluid container 160. In addition, by removing the dissolved oxygen in this way, the effect of improving the speed and accuracy of the measurement may be achieved.

Meanwhile, a method of measuring turbidity using the turbidity meter 100 according to an embodiment of the present disclosure is performed as follows.

First, when the power switch 186 is pressed, an initial cleaning is performed while waiting for a predetermined time period (e.g., three minutes).

Next, when the measurement button 187 is pressed, the measurement is repeatedly performed automatically at a predetermined time interval (e.g., one minute interval). This will be described in detail as follows.

First, in a state in which the fluid inlet pipe 181 is open and the fluid outlet pipe 182 is closed, a fluid is introduced into the fluid container 160 via the fluid inlet pipe 181 and is completely filled in the fluid container 160.

Next, in a state in which the fluid inlet pipe 181 is closed and the fluid outlet pipe 182 is closed, a turbidity measurement is performed. That is, the measurement is performed as waves irradiated from the wave source 110 are multiple-scattered in the fluid L and then are detected by the detector 120.

Next, when the measurement is finished, the fluid inlet pipe 181 is closed and the fluid outlet pipe 182 is open, and thus the fluid in the fluid container 160 is discharged to the outside.

Next, in a state in which the fluid inlet pipe 181 is open and the fluid outlet pipe 182 is open, a fluid is introduced into the fluid container 160, so that cleaning is performed.

The turbidity of the fluid is measured while repeatedly performing the above processes. By measuring the turbidity using the turbidity meter 100 of the present disclosure as described above, a rapid measurement may be performed in real-time as compared with the conventional turbidity meter, which allows the turbidity meter to be easily maintained and repaired.

Figure 6A:
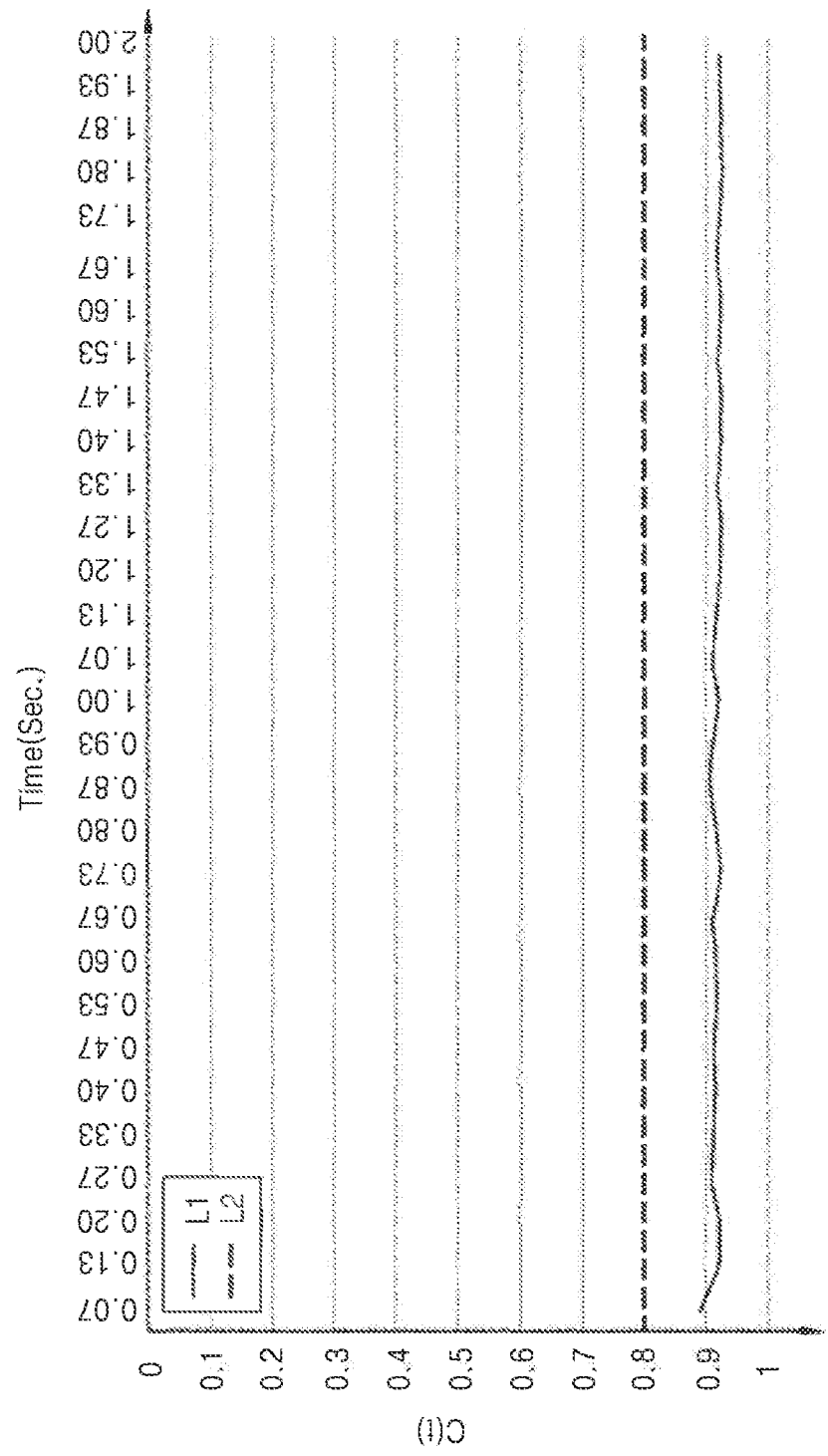
FIGS. 6A to 6C are graphs illustrating a temporal correlation coefficient according to a concentration of bacteria in a fluid in the turbidity meter according to an embodiment of the present disclosure.
Figure 6B:
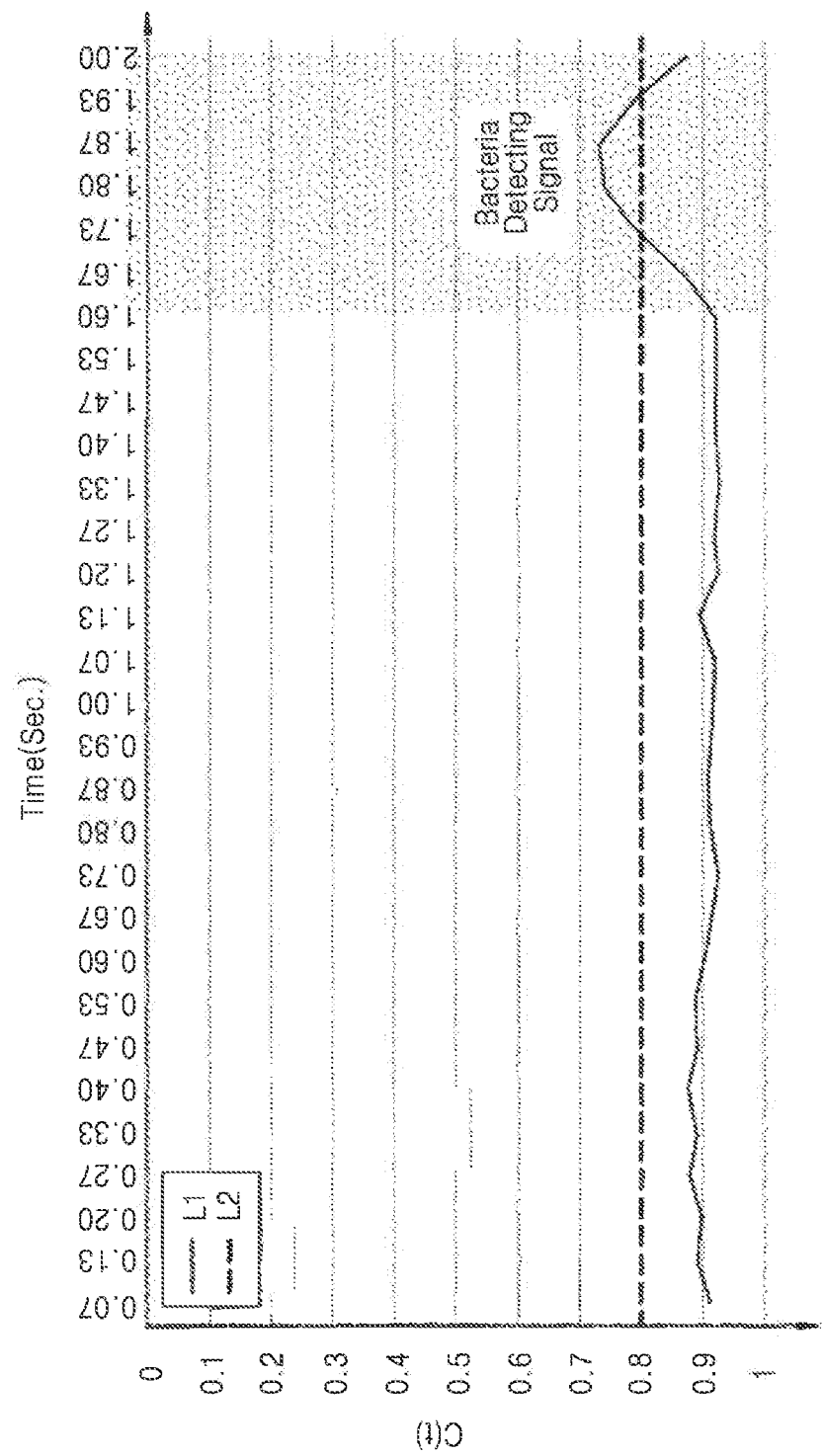
Figure 6C:
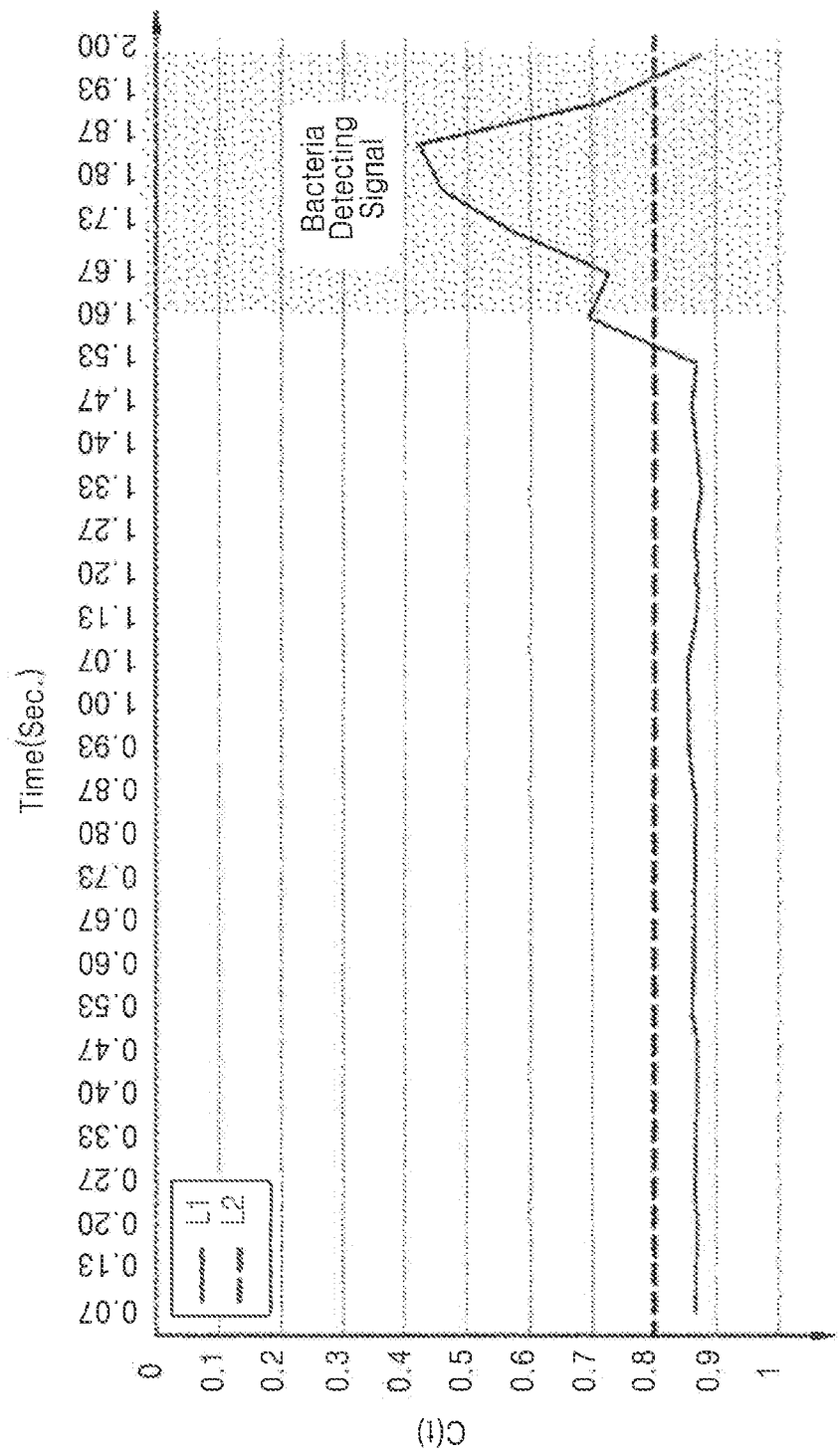

FIGS. 6A to 6C are graphs illustrating a temporal correlation coefficient according to a concentration of bacteria in a fluid in the turbidity meter according to an embodiment of the present disclosure. FIGS. 6A to 6C depict changes in the temporal correlation coefficient according to the concentration when the microorganisms are artificially injected into the fluid contained in the fluid container 160.

In the graphs of FIGS. 6A to 6C, an x-axis is an axis related to a time (t) and a y-axis is an axis related to the temporal correlation coefficient (C(t)). Here, a dashed line L2 denotes a reference value of the temporal correlation coefficient of the laser speckle set in advance in the detector 120. In addition, a solid line L1 denotes measurement data of the temporal correlation coefficient of the laser speckle obtained according to the time through the detector 120.

The solid line L1 in FIG. 6A denotes the temporal correlation coefficient of the laser speckle obtained through the detector 120 when the microorganisms are not injected in the fluid. Referring to FIG. 6A, it can be seen that, when no microorganisms are present in the fluid, there is no change in the laser speckle generated due to the scattering in the fluid, and thus, the temporal correlation coefficient is almost constant according to time and does not exceed the reference value (L2) set in advance.

The solid line L1 in FIG. 6B denotes the temporal correlation coefficient of the laser speckle obtained through the detector 120 when 4 ml of microorganisms with a concentration of 10° cfu/ml are injected into the fluid. In addition, the solid line L1 in FIG. 6C denotes the temporal correlation coefficient of the laser speckle obtained through the detector 120 when 4 ml of microorganisms with a concentration of 101 cfu/ml are injected into the fluid.

Referring to FIGS. 6B and 6C, when microorganisms are present in the fluid, the temporal correlation coefficient changes at a time point of detecting the microorganisms, because the laser speckle generated due to the scattering in the fluid changes according to time. Shaded regions (Bacteria Detecting Signal) in FIGS. 6B and 6C denote the change in the temporal correlation coefficient at the time point of detecting the microorganisms, and it can be seen that as the concentration of the microorganisms increases, a peak value of the temporal correlation coefficient increases. Meanwhile, in the shaded regions of FIGS. 6B and 6C, the detector 120 may determine that the microorganisms are present, when the temporal correlation coefficient (L1) of the laser speckle exceeds the dashed line L2, which indicates the reference value set in advance. In this case, when the microorganisms are present, a measurement time taken for the detector 120 to detect the microorganisms may be a section from a time point when the temporal correlation coefficient changes rapidly to a time point when the temporal correlation coefficient meets the dashed line L2, which indicates the reference value, and, referring to FIGS. 6B and 6C, it can be seen that the measurement time may be about 0.2 seconds or less.

Thus, it can be seen that the turbidity meter according to embodiments of the present disclosure detects the microorganisms, which are impurities in the fluid, in a very short time, e.g., 0.2 sec or less, that is, in real-time. In addition, it can be seen that the turbidity meter according to embodiments of the present disclosure estimates the concentration of the microorganisms using the change rate or peak value of the temporal correlation coefficient. In addition, it can be seen that the turbidity meter is capable of detecting the microorganisms even when the concentration of the microorganisms is low (10° cfu/ml).

As described above, the turbidity meter according to embodiments of the present disclosure may rapidly estimate the presence or absence or concentration of microorganisms in the fluid at low costs, by using the change in the temporal correlation of the laser speckle.

Hereinafter, a method of detecting microorganisms in a turbidity meter according to another embodiment of the present disclosure will be described. In the method of detecting the microorganisms in the turbidity meter according to another embodiment of the present disclosure, the presence or absence or concentration of the microorganisms in a fluid is detected by using a spatial correlation, instead of the temporal correlation. This will be described in more detail below.

FIGS. 7A to 7D and 8A to 8C are diagrams for describing principles of detecting microorganisms in the turbidity meter according to another embodiment of the present disclosure.

Referring to FIGS. 7A to 7D and 8A to 8C, the controller 130 may receive an optical image measured in a time-serial manner from the detector 120, and may determine information about a concentration of microorganisms in a sample from the optical image.

The controller 130 may obtain a spatial correlation of an interference pattern. Here, the spatial correlation given by Equation below may indicate how a brightness of an arbitrary pixel and a brightness of a pixel spaced apart from the arbitrary pixel by a distance r are similar to each other on an image measured at a time t, in a number within a certain range (see FIG. 7B) The certain range may be a range from −1 to 1. That is, the spatial correlation indicates the degree of correlation between an arbitrary pixel and another pixel, with a value of 1 indicating a positive correlation, −1 indicating a negative correlation, and 0 indicating no correlation. Specifically, before the interference pattern is formed, the brightness is emitted evenly, so that the spatial correlation of a sample image indicates a positive correlation close to 1, but after the interference pattern is formed, the value of correlation may decrease in a direction close to 0.

A brightness measured at the time t in a pixel at a position r'=(x,y) by the detector 120 may be defined as I(r',t), and a brightness of a pixel spaced by a distance r may be defined as I(r'+r,t). Using this, the spatial correlation may be expressed by Equation 5 below.

$$C(r, t) = \frac{1}{C_0(t)} \int \int I(r' + r, t) I(r', t) dr' \qquad \text{[Equation 5]}$$

$C_0(t)$ is used to set the range of Equation 5 between −1 to 1. When the brightness I(r',t) measured at the time t in the arbitrary pixel and the brightness I(r'+r,t) of the pixel spaced by the distance r are equal to each other, the spatial correlation is derived as 1, and when the above brightnesses are not equal to each other, the spatial correlation has a value less than 1.

In an embodiment of the present disclosure, the spatial correlation as described above may be only represented as a function of time. To this end, the controller 130 may calculate an average of the spatial correlation with respect to the pixel having the distance r from the arbitrary pixel and having the same size by using Equation 6 below (see FIG. 7B).

$$C(\rho, t) = \frac{1}{2\pi} \int_0^{2\pi} C(r, t) d\theta \qquad \text{[Equation 6]}$$

In an embodiment, the controller 130 may substitute a distance set in advance in Equation 6 above to represent a function of time, and it can be seen that, by using this function, the controller 130 may identify a degree of forming the interference pattern as a value between 0 and 1, which is a certain range (see FIG. 7D).

The controller 130 may also distinguish between foreign matters and microorganisms in the sample based on a change in the pattern of the sample image according to time. In the case of foreign matters, there is no change in the image according to time, but in the case of the microorganisms, the image changes in shape, size, and the like according to time, and thus, the turbidity meter 100 may distinguish between the foreign matters and the microorganisms.

Meanwhile, the controller 130 may also determine information about the concentration of the microorganism using the spatial correlation as follows. Spatial correlation may be obtained by using one image to generate two identical overlaid images, shifting one of the two images by a preset distance in one direction, and analyzing how two adjacent pixels in the shifted image and non-shifted image are similar to each other. Here, the spatial correlation is a measure of how uniform the image is, and when an interference pattern is generated due to a colony, a value of the spatial correlation also decrease since similarity between two adjacent pixels decreases due to small interference patterns.

The above spatial correlation coefficient varies depending on the shifted distance r (see FIG. 7C), and within a certain distance range, as the shifted distance r increases, the value of the spatial correlation coefficient decreases, and over the certain distance range, the value of the spatial correlation coefficient is nearly constant. Accordingly, in order to obtain a more significant spatial correlation, the controller 130 may obtain the spatial correlation by shifting the image by a certain distance set in advance or greater. In this case, the certain distance r set in advance depends on a speckle size, and the controller 130 may obtain the spatial correlation by shifting the image as much as a pixel size greater than the speckle size when expressed in units of pixel. For example, the certain distance set in advance may be at least three-pixel distance or greater.

Meanwhile, in addition to the spatial correlation as described above, the controller 130 may also obtain the temporal correlation of the interference pattern of the measured sample image, and detect the microorganisms on the basis of the obtained temporal correlation. The controller 130 may calculate the temporal correlation coefficient between images by using image information of the interference pattern measured in the time-serial manner, and may detect a microorganism colony in the sample on the basis of the temporal correlation coefficient.

The controller 130 may detect the microorganisms through an analysis in which the calculated temporal correlation coefficient decreases to a reference value set in advance or less.

For the above analysis, the turbidity meter 100 according to an embodiment of the present disclosure may further include a multiple scattering amplification member for amplifying the number of multiple scattering times of light incident on the fluid container 160 in the sample. For example, the multiple scattering amplification member (not shown) is provided on a moving path of the light between the wave source 110 and the fluid container 160 or between the fluid container 160 and the detector 120, and may amplify the number of multiple scattering times of the light. The multiple scattering amplification member (not shown) is formed in a structure attachable to or detachable from the turbidity meter 100, and may be used as necessary. With the aforementioned configuration, the turbidity meter according to embodiments of the present disclosure may detect the microorganisms in the fluid in the fluid container 160 within a short period of time.

The present disclosure has been described above in relation to its preferred embodiments. It will be understood by those skilled in the art that various changes in form may be made therein without departing from the essential features of the present disclosure. Therefore, the disclosed embodiments should be considered in a descriptive sense only and not for purposes of limitation. The scope of the present disclosure is defined not by the detailed description of the disclosure but by the appended claims, and all differences within the scope will be construed as being included in the present disclosure.

INDUSTRIAL APPLICABILITY

According to an embodiment of the present disclosure, there is provided a turbidity meter. In addition, embodiments of the present disclosure may be applied to impurity or microorganism detection devices for industrial use.

What is claimed is:
1. A turbidity meter comprising:
a main body;
a fluid container which is formed inside the main body and in which a fluid is accommodatable;
a fluid inlet pipe which is connected to the fluid container and via which the fluid is supplied to the fluid container;
a fluid outlet pipe which is connected to the fluid container and via which the fluid is discharged from the fluid container to the outside;
a wave source configured to irradiate waves toward the fluid container;
a detector configured to detect a laser speckle at every time point set in advance, the laser speckle being generated due to multiple scattering of the irradiated waves in the fluid; a controller configured to estimate presence or absence of impurities in the fluid in real-time by using the detected laser speckle; and
a calibration button configured to turn on or off a calibration function, the calibration function being configured to periodically inject a standard material having a known measurement value into the fluid container, and wherein dissolved oxygen present in the fluid is removed by periodically supplying the fluid into the fluid container via the fluid inlet pipe and discharging the fluid from the fluid container via the fluid outlet pipe.
2. The turbidity meter of claim 1, wherein
the fluid container includes:
a bottom portion formed inside the main body; and
a wall portion formed to have a predetermined angle with respect to the bottom portion.
3. The turbidity meter of claim 2, wherein the angle formed by the bottom portion and the wall portion is not a right angle.
4. The turbidity meter of claim 3, wherein the angle is 85° or more and 88° or less.
5. The turbidity meter of claim 2, wherein the wall portion tapers toward an upper surface of the main body.
6. The turbidity meter of claim 2, wherein the bottom portion or the wall portion includes a multiple scattering amplification region for amplifying a number of times the wave irradiated from the wave source is multiple-scattered in the fluid.

7. The turbidity meter of claim 6, wherein the multiple scattering amplification region amplifies the number of multiple scattering in the fluid by reflecting at least some of the waves emitted from the fluid onto the fluid.

8. The turbidity meter of claim 1, wherein a height of the fluid outlet pipe is formed to be less than or equal to a height of the fluid inlet pipe.

9. The turbidity meter of claim 1, wherein a second fluid outlet pipe is further disposed at a higher position than the fluid inlet pipe and the fluid outlet pipe.

10. The turbidity meter of claim 1, wherein the controller obtains a temporal correlation of the detected laser speckle by using the detected laser speckle, and estimates the presence or absence of microorganisms in the fluid in real-time on the basis of the obtained temporal correlation.

11. The turbidity meter of claim 10, wherein the temporal correlation includes a difference between first image information of the laser speckle detected at a first time point and second image information of the laser speckle detected at a second time point that is different from the first time point.

12. The turbidity meter of claim 11, wherein the first image information and the second image information include at least one of pattern information of the laser speckle and intensity information of the wave.

13. The turbidity meter of claim 1, wherein the controller obtains a spatial correlation of an interference pattern of an optical image detected by the detector, and determines the presence or absence of microorganisms in the fluid on the basis of a change in the spatial correlation of the interference pattern according to time.

14. A method of examining turbidity, the method comprising:
    filling a fluid container with a fluid by introducing the fluid into the fluid container via a fluid inlet pipe;
    irradiating, by a wave source, a wave having coherence to the fluid container, in which the fluid is accommodated;
    detecting, by a detector, a laser speckle generated by multiple scattering of the irradiated wave from the wave source in the fluid, at every time point set in advance;
    estimating, by a controller, presence or absence of microorganisms in the fluid in real-time by using the detected laser speckle;
    discharging the fluid in the fluid container to the outside via a fluid outlet pipe;
    removing dissolved oxygen in the fluid by introducing the fluid into the fluid
    container via the fluid inlet pipe and discharging the fluid in the fluid container to the outside via the fluid outlet pipe; and
    performing a calibration function by turning on a calibration button, the calibration function being configured to periodically inject a standard material having a known measurement value into the fluid container.

* * * * *